United States Patent
Crue et al.

(10) Patent No.: US 6,594,112 B1
(45) Date of Patent: Jul. 15, 2003

(54) MAGNETIC RECORDING HEAD WITH A PRECISION THROATHEIGHT-DEFINING STRUCTURE

(75) Inventors: Billy Wayne Crue, Pittsburgh, PA (US); Robert Earl Rottmayer, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 80 days.

(21) Appl. No.: 09/755,504

(22) Filed: Jan. 5, 2001

Related U.S. Application Data

(60) Provisional application No. 60/174,523, filed on Jan. 5, 2000.

(51) Int. Cl.[7] .............................. G11B 5/147; G11B 5/23
(52) U.S. Cl. ........................................................ 360/126
(58) Field of Search .................................. 360/120, 125, 360/126, 315, 316

(56) References Cited

U.S. PATENT DOCUMENTS

| | | |
|---|---|---|
| 3,940,797 A | 2/1976 | Brock et al. |
| 3,955,213 A | 5/1976 | Brower et al. |
| 4,017,965 A | 4/1977 | Brutsch et al. |
| 4,100,584 A | 7/1978 | Behr et al. |
| 4,110,804 A | 8/1978 | Castrodale et al. |
| 4,219,855 A | 8/1980 | Jones, Jr. |
| 4,490,760 A | 12/1984 | Kaminaka et al. |
| 5,438,747 A * | 8/1995 | Krounbi et al. ............. 360/317 |
| 5,479,310 A * | 12/1995 | Atsushi et al. ............... 360/126 |
| 5,612,843 A | 3/1997 | Packard |
| 5,621,596 A | 4/1997 | Santini |
| 5,652,687 A | 7/1997 | Chen et al. |
| 5,978,187 A * | 11/1999 | Shouji et al. ................ 360/126 |
| 6,018,862 A * | 2/2000 | Stageberg et al. ........... 360/126 |
| 6,111,724 A * | 8/2000 | Santini ........................ 360/126 |
| 6,134,080 A * | 10/2000 | Chang et al. ................ 360/126 |
| 6,172,848 B1 | 1/2001 | Santini |
| 6,233,813 B1 | 5/2001 | Sasaki et al. |
| 6,369,984 B1 * | 4/2002 | Sato ............................ 360/126 |
| 6,490,125 B1 * | 12/2002 | Barr ............................ 360/126 |

OTHER PUBLICATIONS

Jeong et al. "Magnetization and Magnetic Anisotropy in NiPd Multilayer Films." Digest of Magnetics Conference, 1999, p. G 09.*

* cited by examiner

Primary Examiner—George J. Letscher
Assistant Examiner—Christopher R. Beacham
(74) Attorney, Agent, or Firm—Robert P. Lenart, Esq.; Pietragallo, Bosick & Gordon

(57) ABSTRACT

A recording head for use with magnetic recording media includes a structure having a precisely defined throat height. The throat height of a typical recording head is defined by a photoresist structure formed through a hard bake process. It is difficult to control the thickness of the photoresist during the spinning and hard bake process, resulting in magnetically inefficient structure at the tip of the recording head's main write pole. The use of an NiPd plating results in a more accurately defined throat height, and resulting magnetically efficient structure. A method of manufacturing the recording head of the present invention is also provided.

13 Claims, 11 Drawing Sheets

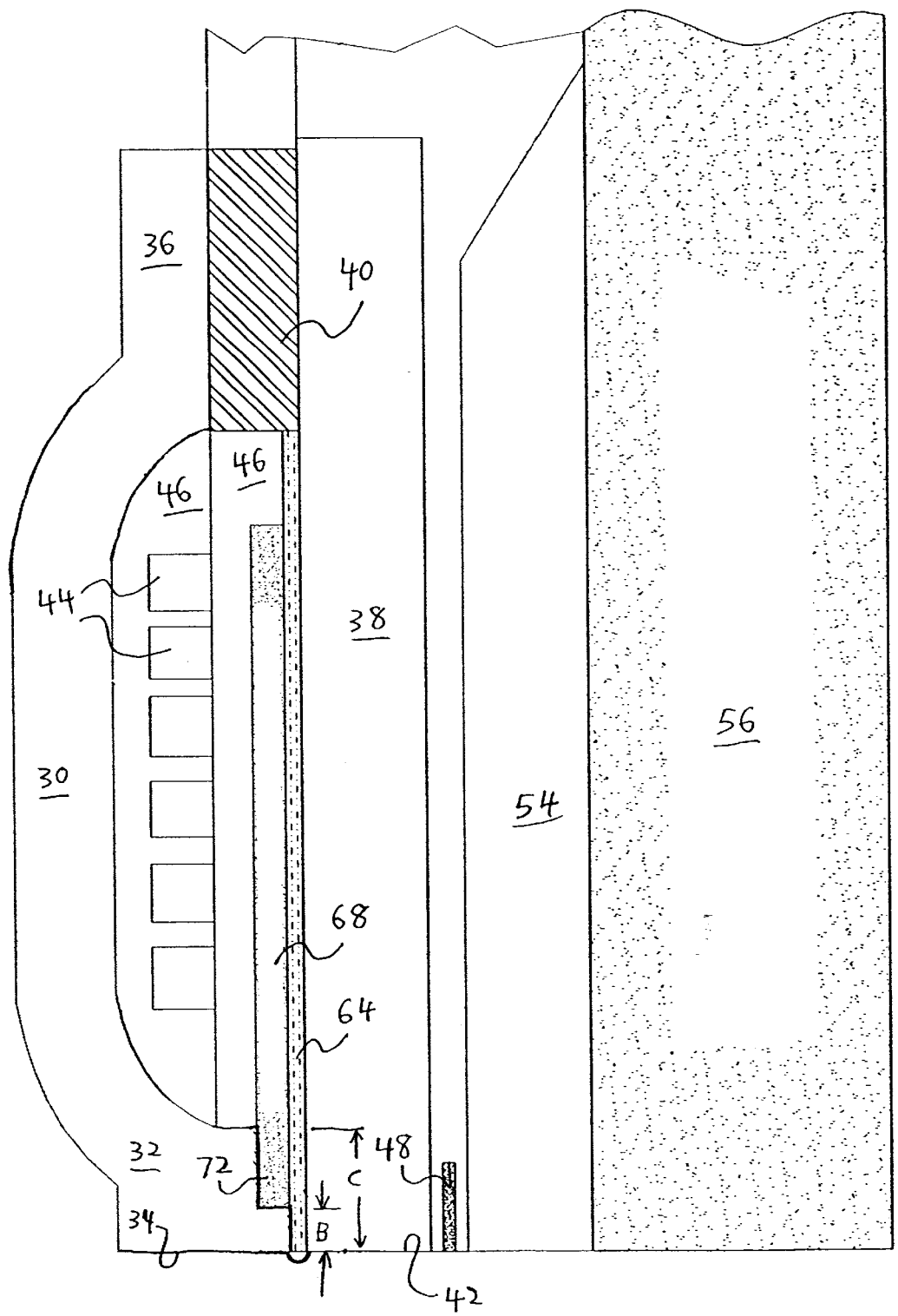

MAGNETIC RECORDING HEAD WITH A PRECISION THROATHEIGHT-DEFINING STRUCTURE

CROSS REFERENCE TO RELATED APPLICATION

This application claims the benefit of U.S. Provisional Patent Application No. 60/174,523, filed on Jan. 5, 2000.

BACKGROUND OF THE INVENTION

1. Field of the Invention

The present invention relates to recording heads for use with magnetic recording media. More specifically, the present invention is an improved structure and method of manufacturing a recording head, resulting in better throat definition.

2. Description of the Related Art

Recording heads for use with magnetic recording media typically include a pair of magnetically coupled poles, with a coil located adjacent to one of the poles for inducing a magnetic field within the poles. A typical longitudinal recording head will have two poles having approximately the same surface area on their bottom surfaces, while a typical perpendicular recording head will have a main pole and opposing pole, with the main pole having a significantly smaller bottom surface area than the opposing pole. A common magnetic recording medium includes a layer having a plurality of magnetic tracks, with each track divided into sectors. The tracks are separated by nonmagnetized transitions. If perpendicular recording is used, the recording medium will typically include a layer of magnetically soft material below the recording layer.

The tip of the main right pole is typically in very close proximity to the tip of the opposing pole. The distance for which the main right pole and opposing pole maintain their close proximity is known as the throat height. The throat height in presently used recording heads is typically defined by a layer of hard baked photoresist. The process of spinning the photoresist fluid across the surface to which it is applied is a difficult process in which to control the thickness of the photoresist. Additionally, the photoresist shrinks at uncontrolled rates during the hard baked process. Furthermore, the hard baked process causes deterioration within the layers of a typical GMR read element or spin valve.

A main write pole having a proper tip structure is critical to the magnetic performance of the recording head. Therefore, a recording head having a more precisely defined throat height is desired. Additionally, a method of manufacturing a recording head having a precisely defined throat height is needed.

SUMMARY OF THE INVENTION

The present invention is an improved longitudinal recording head for use with magnetic recording media, and a method of making such a recording head.

A preferred embodiment of the present invention includes a recording head combining a read portion and a write portion, although the invention is primarily directed towards the write portion of the recording head. The read portion of the recording head includes a read element, which may be a GMR read element or a spin valve, and a pair of magnetic shields on either side of the read element. The write portion includes a main pole and an opposing pole magnetically coupled to the main pole. An electrically conductive coil is located adjacent to the main pole. One of the two shields of the read element may also serve as the opposing pole. The tips of the main and opposing poles incorporate a throat, wherein the main pole and opposing pole are in close proximity to each other. The height above the bottom surface of the poles for which the two poles are in such close proximity is known as the throat height. The throat height for a recording head of the present invention is defined by a plated layer of NiPd, directly adjacent to the write gap.

The process of manufacturing a recording head of the present invention begins by providing a substrate having a pair of shields with a read element therebetween. The shield farthest from the substrate may also function as one of the two opposing write poles. The surface of this shield is chemical mechanical polished to ensure that it is completely flat. A write gap, preferably alumina, is deposited on this surface. The NiPd throat height structure is then plated on top of the write gap. The edge of the throat height structure may be shaped using ion milling if desired. The initial portions of the write pole are then deposited, with a lower initial portion deposited on top of the write gap and bottom of the throat height structure, and an upper portion deposited so that it is magnetically coupled with the opposing pole/shield. Insulating material, preferably alumina, is deposited over the remainder of the throat height structure. The coil may then be deposited, followed by additional insulation and the remainder of the main write pole.

A typical magnetic recording medium includes a recording layer having a plurality of magnetically permeable tracks separated by nonmagnetized transitions. Each track is further divided into sectors.

The recording head is separated from the magnetic recording medium by a distance known as the flying height. The magnetic recording medium is moved past the recording head so that the recording head follows the tracks of the magnetic recording medium, with the write gap oriented perpendicular to the tracks and the direction of travel. Current is passed through the coil to create magnetic flux within the two opposing poles. The magnetic flux passing across the write gap will cause the magnetic fields in the tracks to align with the magnetic flux of the two opposing poles. Changing the direction of electric current changes the direction of the flux created by the recording head, and therefore, the magnetic fields within the magnetic recording medium. A binary "0" is recorded by maintaining a constant direction of magnetic flux through the main pole, and a binary "1" is recorded by changing the direction of magnetic flux through the main pole.

The use of plated NiPd to define the throat height instead of the photoresist as used in prior recording heads enables the throat height and throat configuration to be controlled with a significantly greater degree of precision. A properly configured throat will direct magnetic flux so that it enters the write gap perpendicular to the magnetic recording medium, thereby creating a higher gap field and improved "write bubble". Additionally, steps may be created during the manufacturing process to ensure accurate alignment of the pole tip structure to the throat height structure. Furthermore, the use of plated NiPd instead of photoresist avoids the need for a hard bake process to cure the photoresist, thereby avoiding the various problems caused by this process. The hard bake process can degrade the various layers within the read element. During the hard bake process, the throat height structure shrinks at uncontrolled rates, thereby causing variation in the throat height. Photoresist is applied by spinning the photoresist liquid over the desired surface, a process within which it is difficult to control the thickness of the photoresist applied. Thermal expansion and contraction during the hard bake process also creates a possibility of cracking caused by the resulting stresses within the recording head structure.

It is therefore an aspect of the present invention to provide a longitudinal recording head for use with magnetic recording media having a more precisely defined throatheight than prior recording heads.

It is another aspect of the present invention to provide a method of manufacturing a longitudinal recording head wherein the throatheight may be more precisely controlled.

It is a further aspect of the present invention to provide a longitudinal recording head having an improved write bubble.

It is another aspect of the present invention to provide a longitudinal recording head free of thermally induced stresses.

It is a further aspect of the present invention to provide a method of manufacturing a longitudinal recording head that does not result in degradation of the read element.

These and other aspects of the invention will become apparent through the following description and drawings.

BRIEF DESCRIPTION OF THE DRAWINGS

Like reference numbers denote like elements throughout the drawings.

DETAILED DESCRIPTION OF THE PREFERRED EMBODIMENTS

The present invention is an improved longitudinal recording head for use with magnetic recording media having a structure permitting more precise setting of the throatheight. A method of making such a recording head is also provided. Although not limited to such use, such a recording head is particularly useful for fixed or hard drives for computers. As used herein, recording head is defined as a head adopted for read and/or write operations, although the present invention is specifically directed toward the write portion of the recording head.

Figure 1:
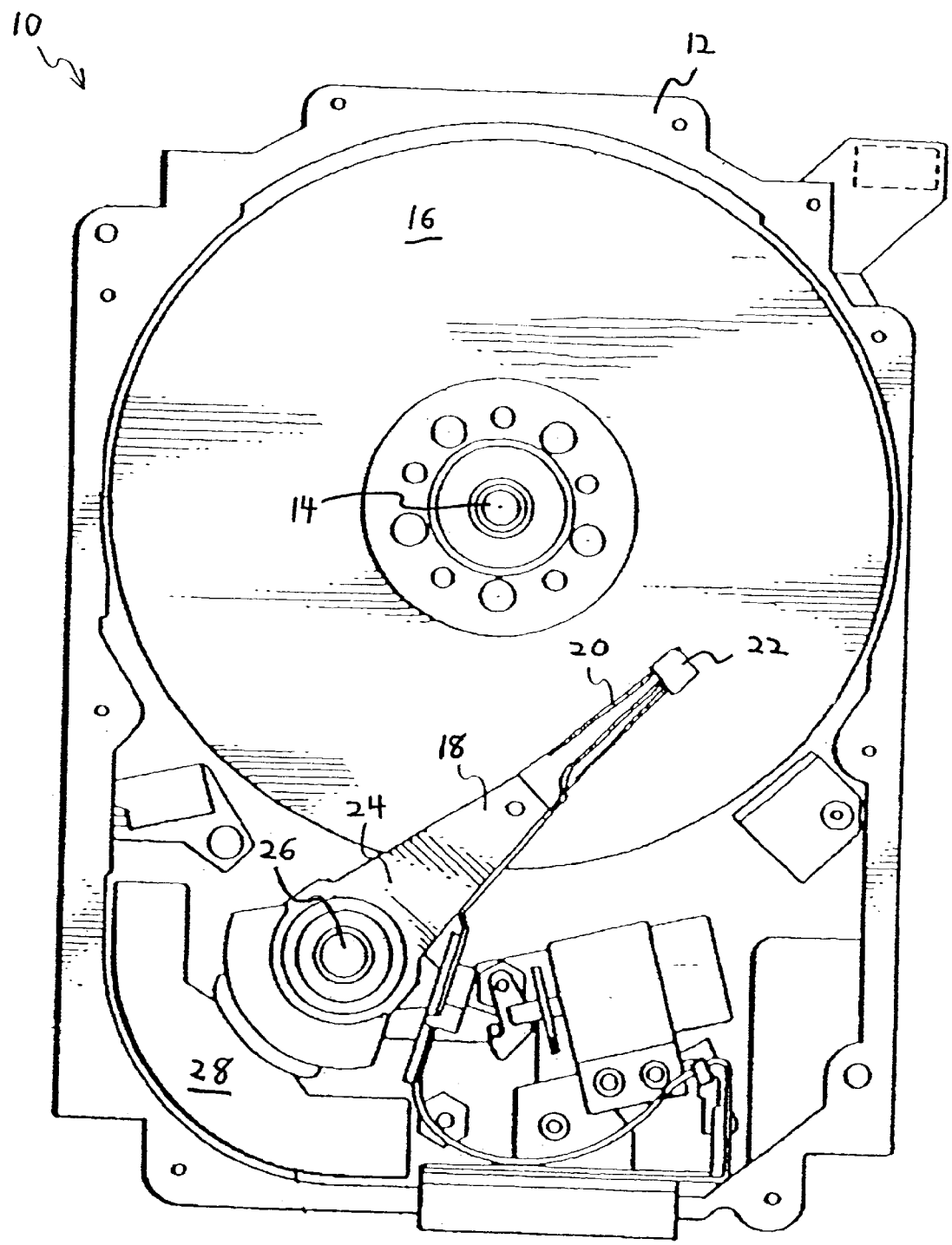
FIG. 1 is a top view of a typical hard disc drive for a computer for which the present invention may be used, illustrating the disc drive with its upper housing portion removed.

The invention will most commonly be used within a fixed disc drive 10 for computers, one of which is illustrated in FIG. 1. The fixed disc drive 10 includes a housing 12 (with the upper portion removed and the lower portion visible in this view for maximum clarity) dimensioned and configured to contain and locate the various components of the disc drive 10. The disc drive 10 includes a spindle motor 14 for rotating at least one magnetic storage medium 16 within the housing, in this case a magnetic disc. At least one arm 18 is contained within the housing 12, with each arm 18 having a first end 20 with a recording head or slider 22, and a second end 24 pivotally mounted to a bearing 26. An actuator motor 28, such as a movable coil DC motor, is located at the arm's second end 24, pivoting the arm 18 to position the head 22 over a desired sector of the disc. The actuator motor 28 is regulated by a controller which is not shown and which is well known.

Figure 2:
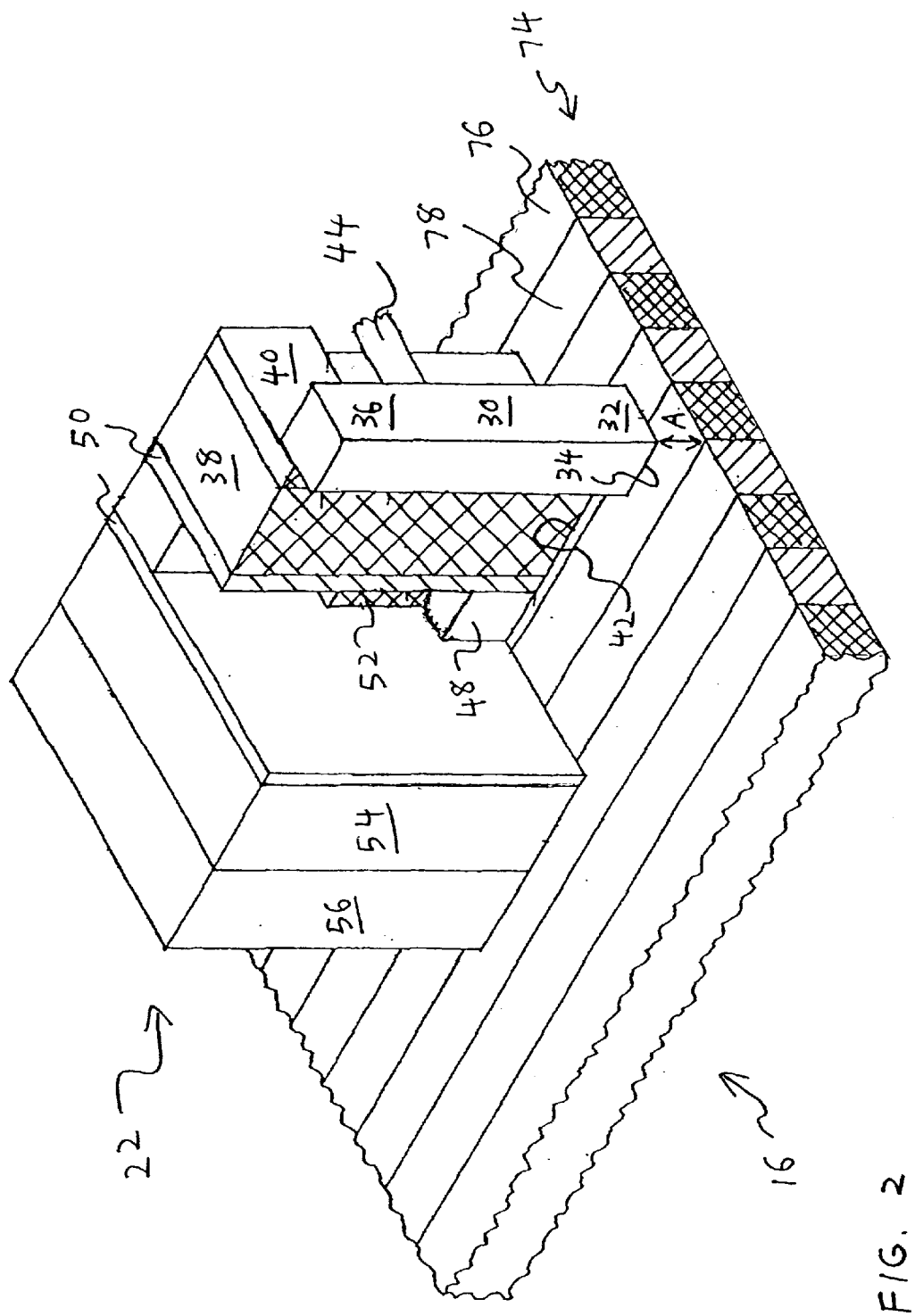
FIG. 2 is a partially section, partially schematic isometric view of an embodiment of a recording head according to the present invention.
Figure 4:
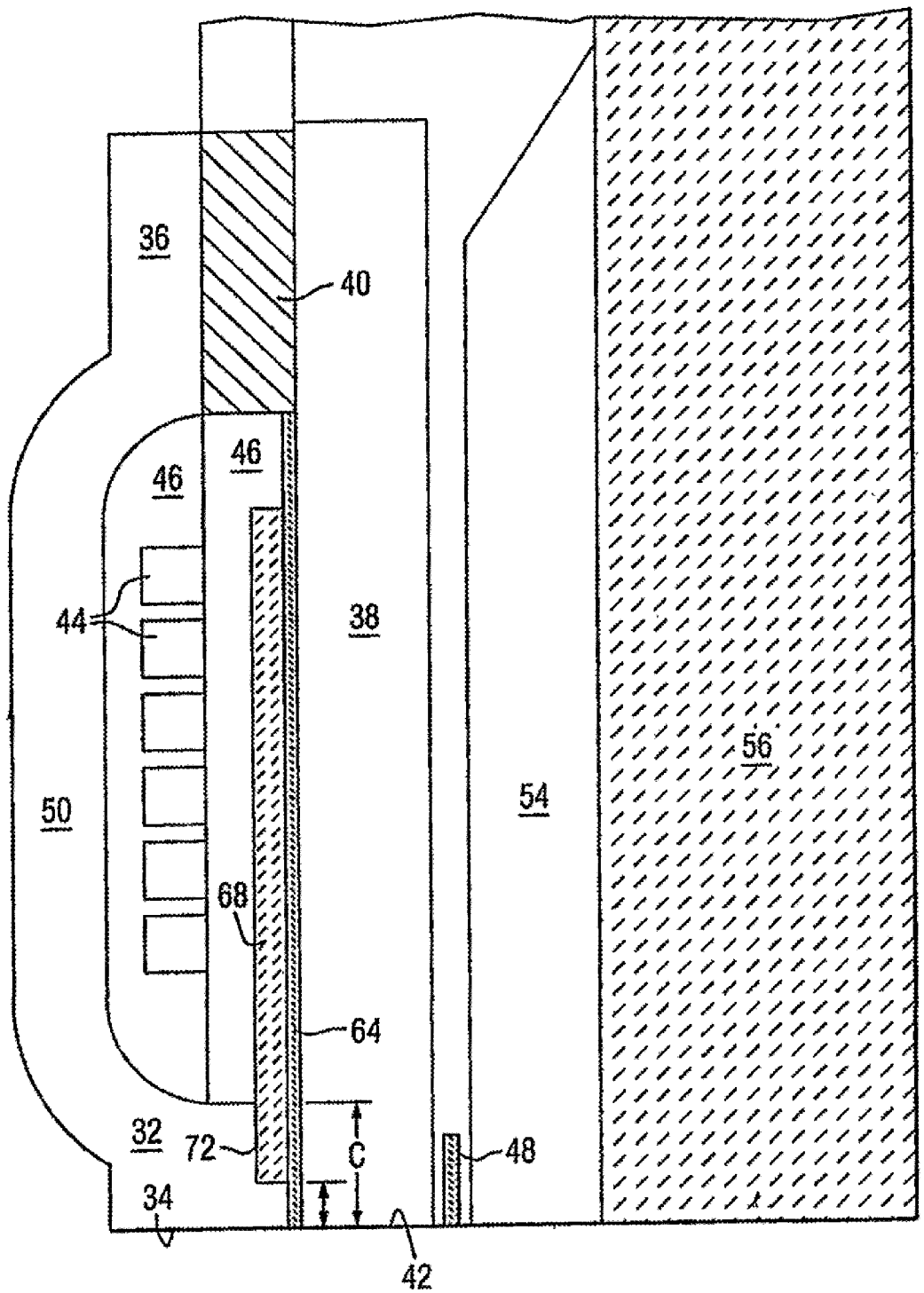
FIG. 4 is a side cross-sectional view of a recording head according to the present invention.
Figure 5:
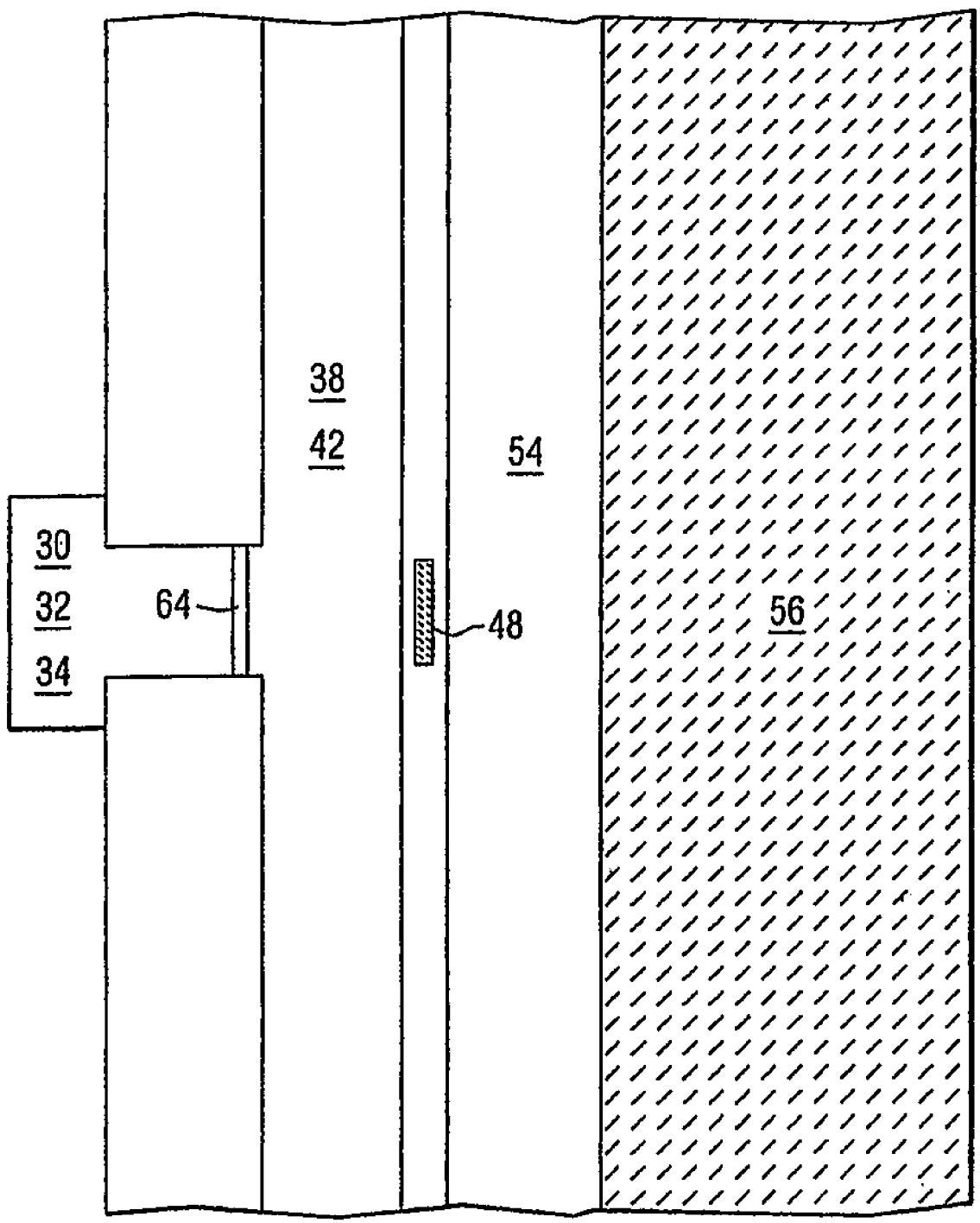
Figure 6:
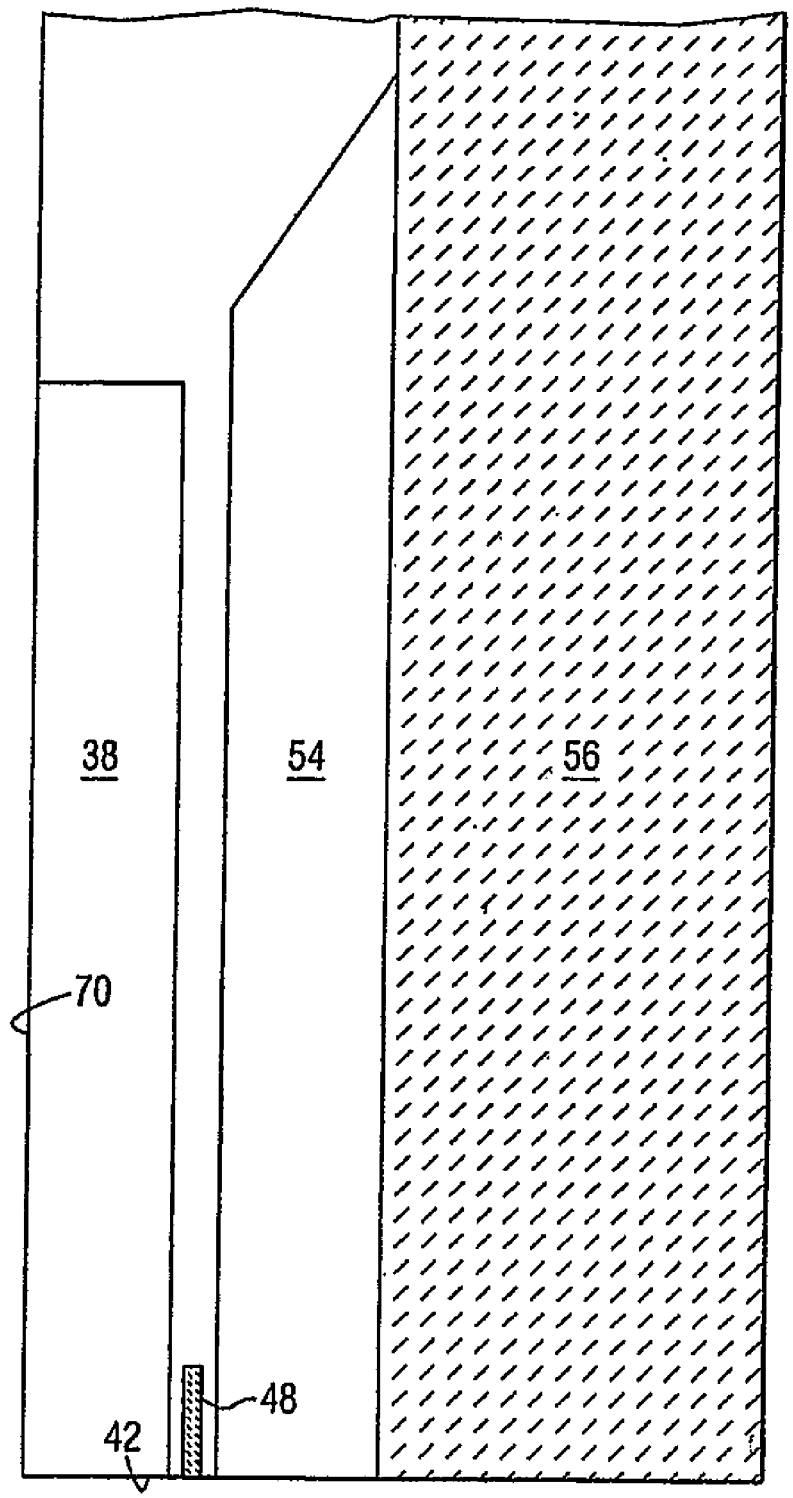
Figure 7:
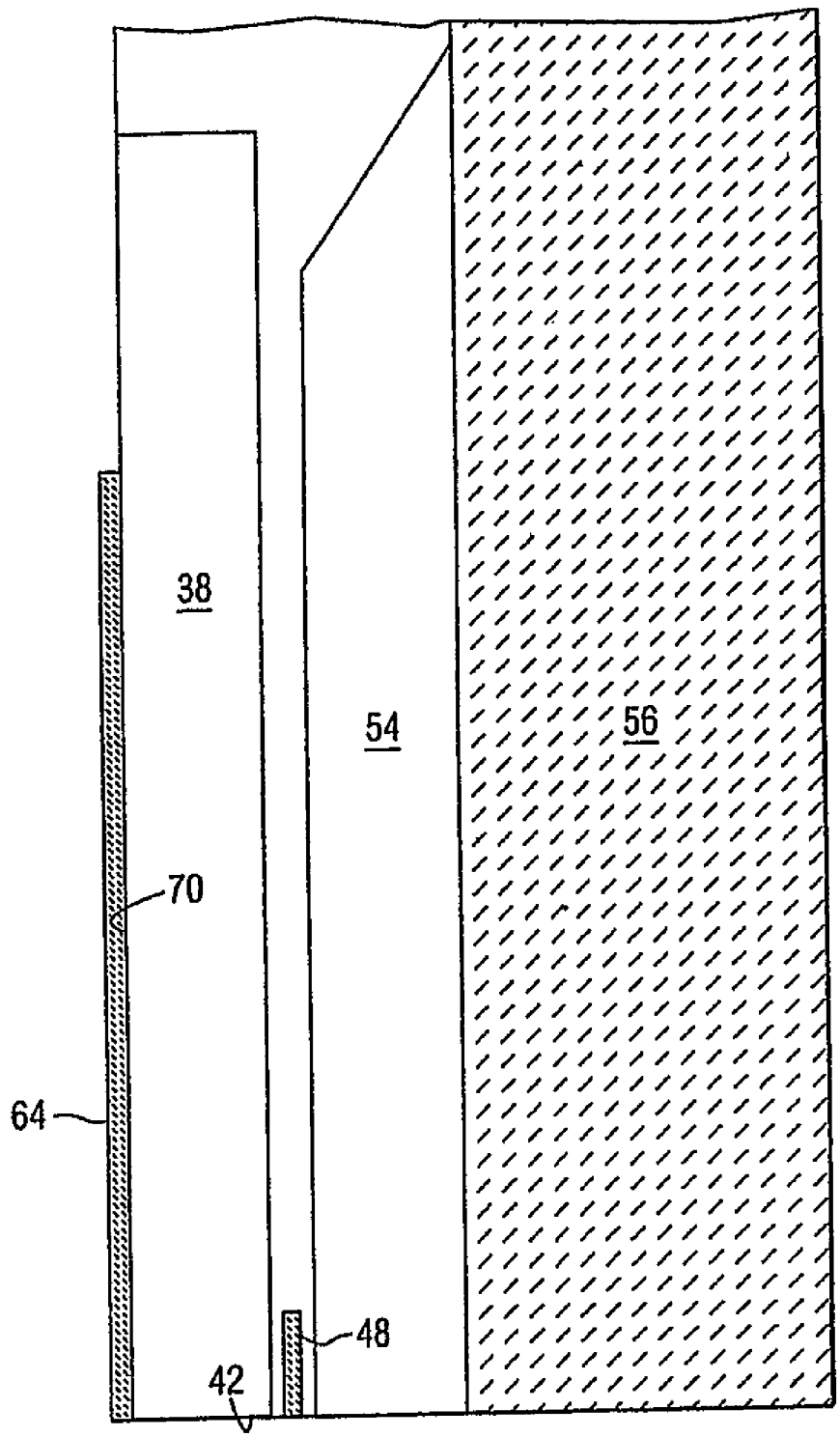
Figure 8:
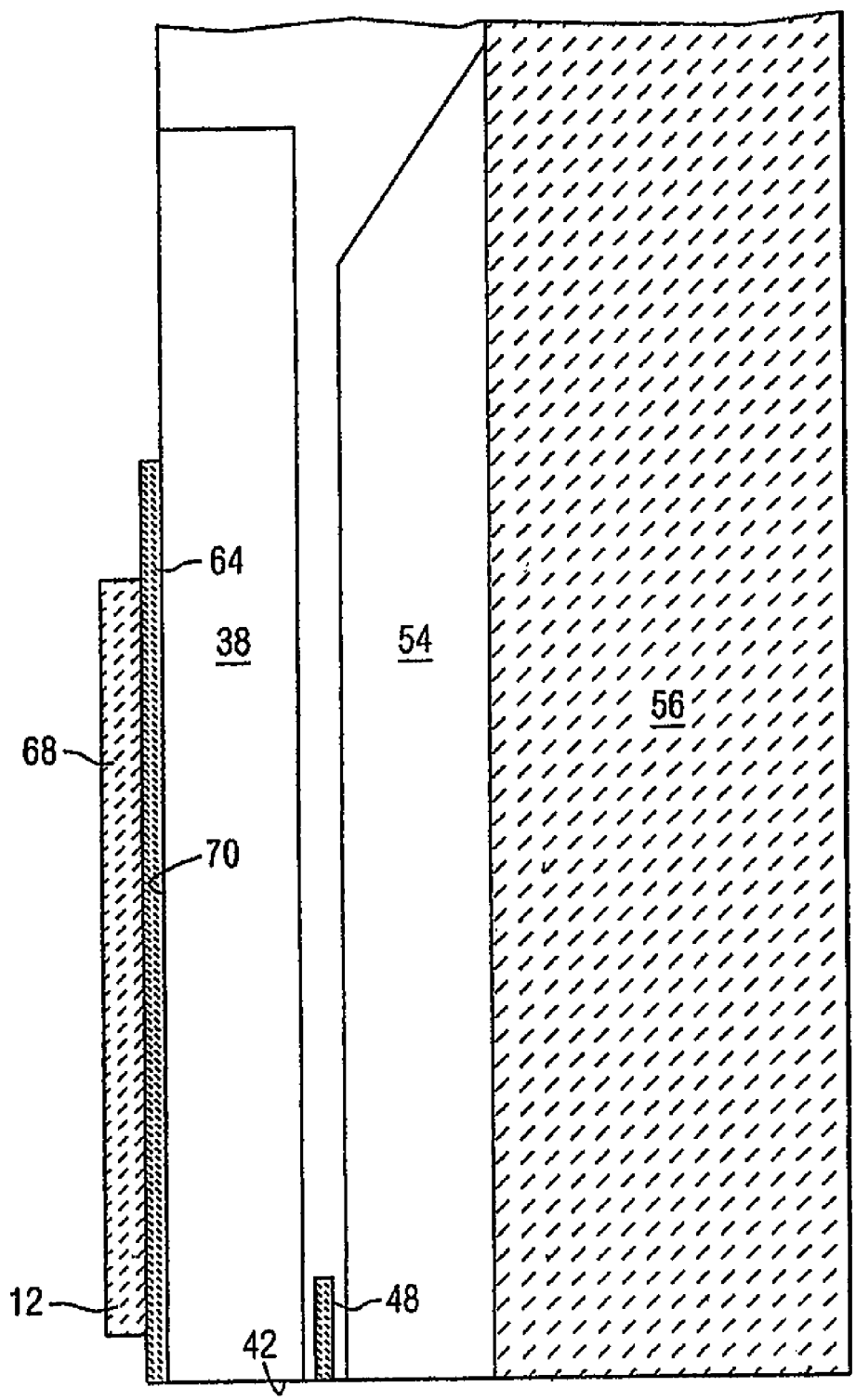
Figure 9:
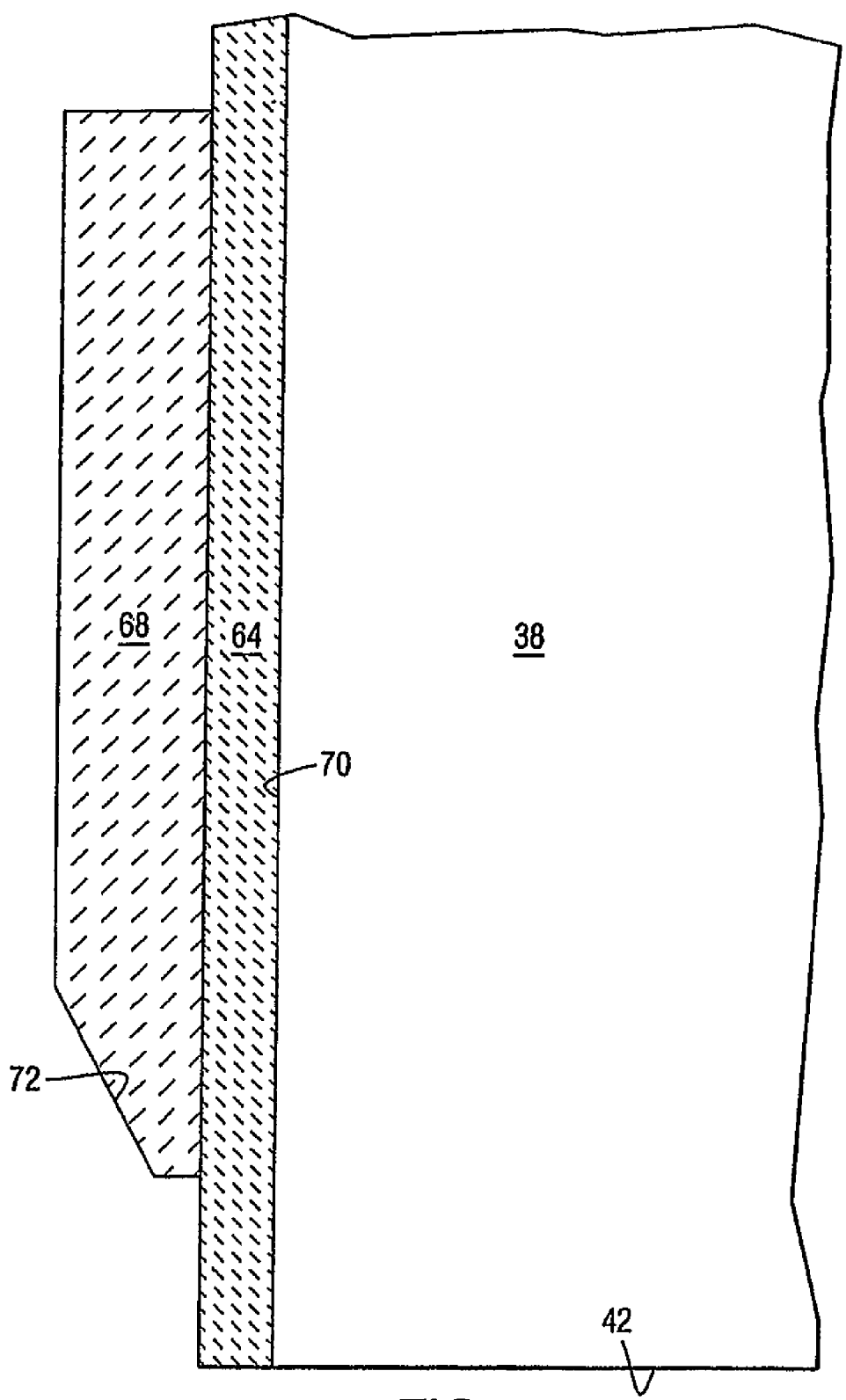
Figure 10:
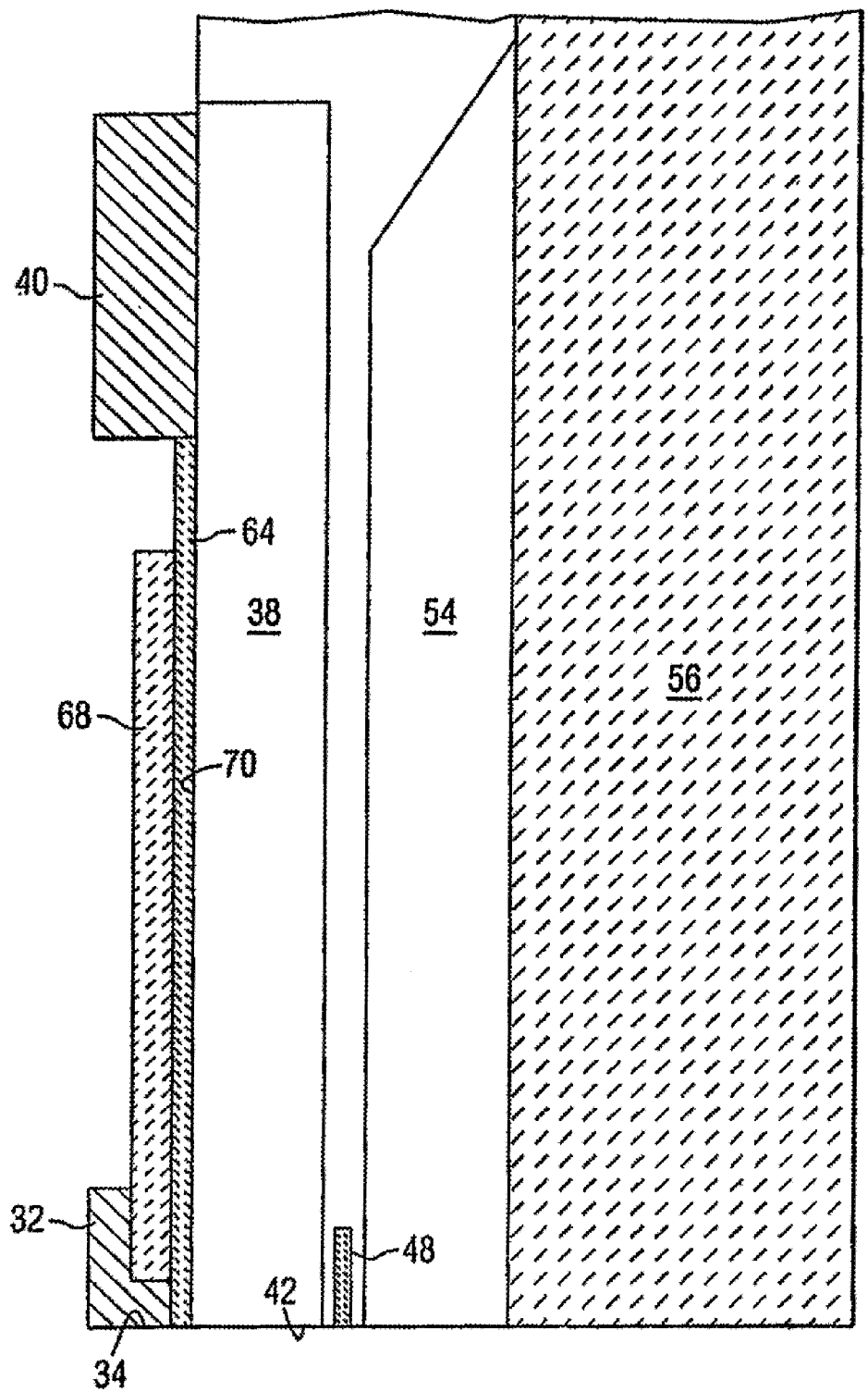
Figure 11:
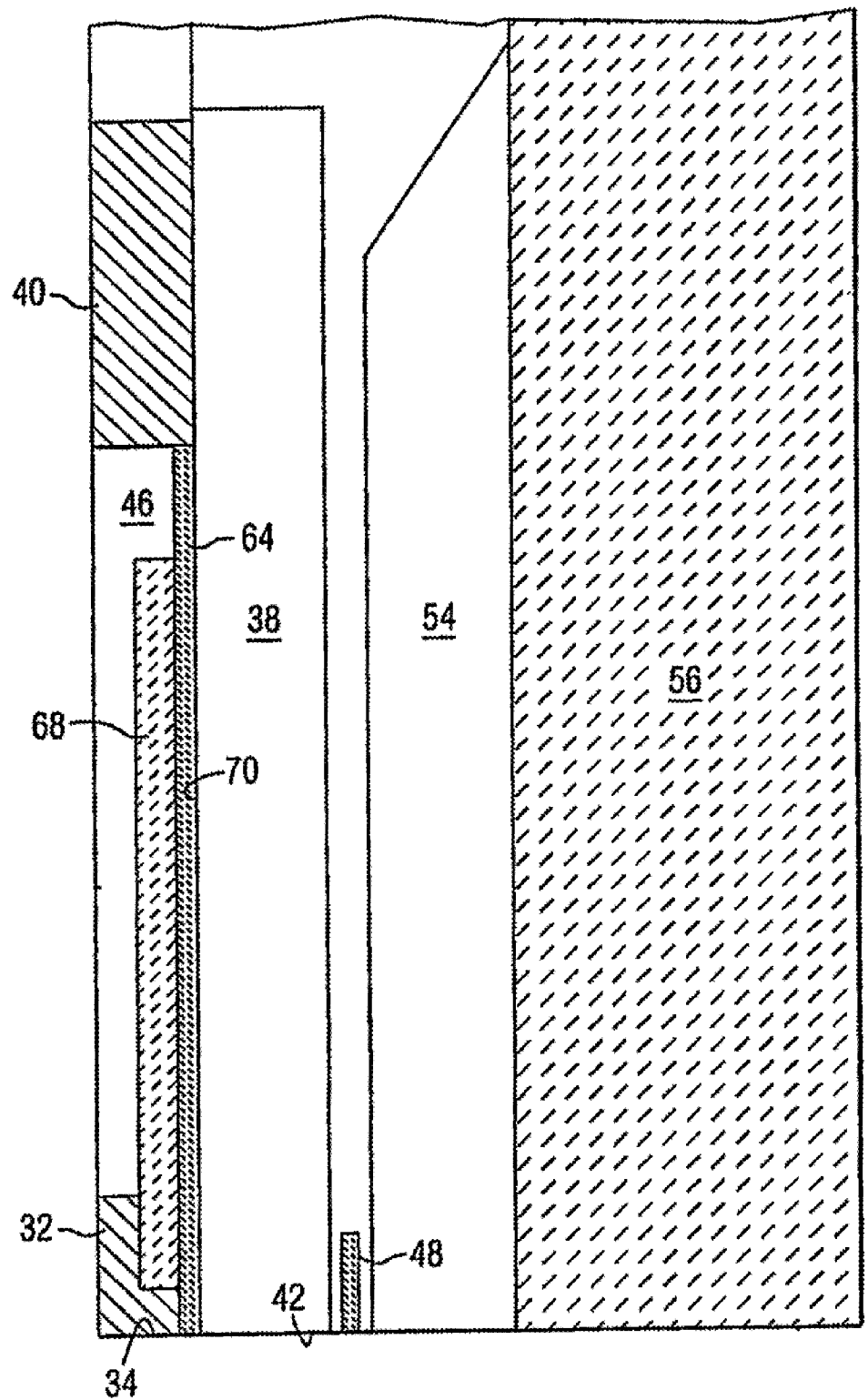

Referring to FIGS. 2 and 4, the features of the recording head 22 are illustrated. The recording head 22 includes a magnetically permeable main pole 30, oriented substantially perpendicular to the magnetic recording medium 16, and having a tip 32. The tip 32 includes a bottom surface 34. The top 36 of the main pole 30 is magnetically coupled to an opposing pole 38, possibly through a joint 40. The opposing pole 38 includes a bottom surface 42, which may or may not have a larger surface area than the bottom surface 34 of the main pole 30. An electrically conductive coil 44 is located adjacent to the main pole 30, and is dimensioned and configured to induce a magnetic flux in the main pole 30. The coil 44 is preferably surrounded by insulation 46.

Figure 3:
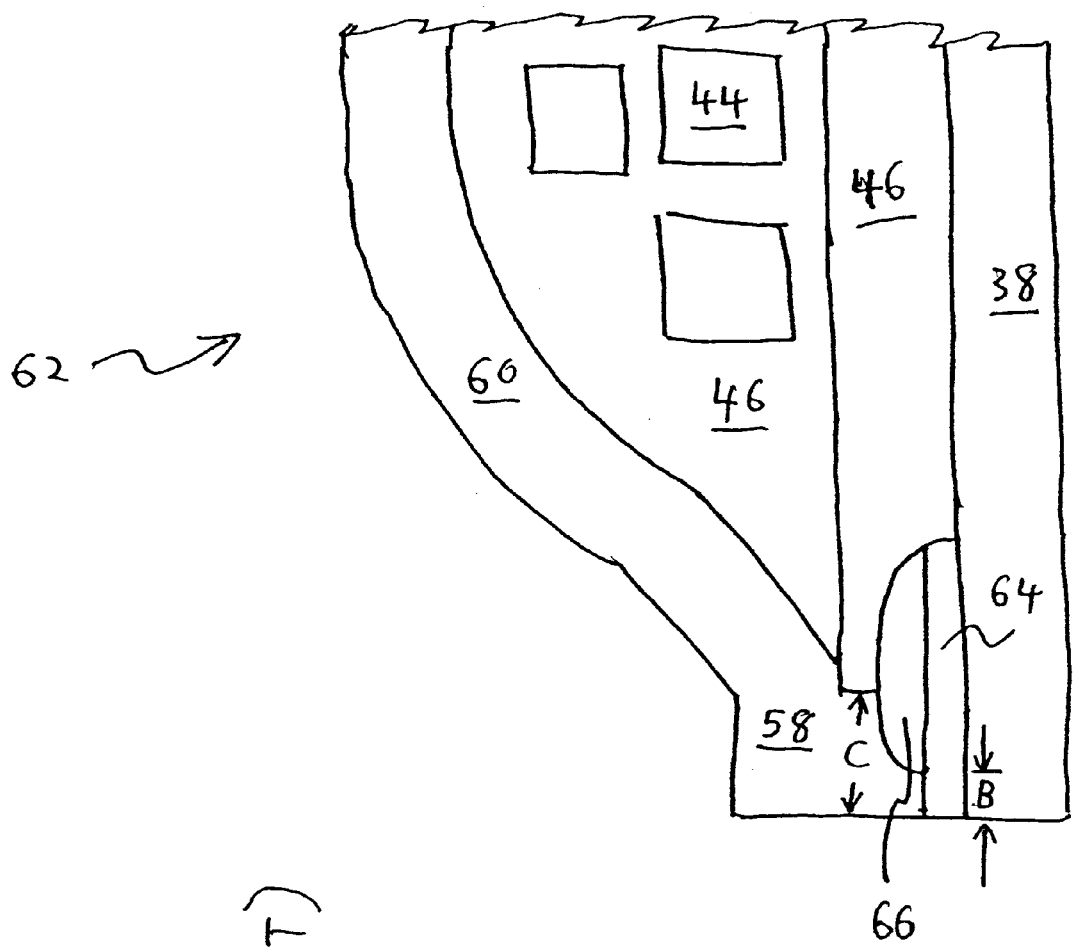
FIG. 3 is a side cross-sectional view of the pole tips of a prior art recording head.
Figure 5:
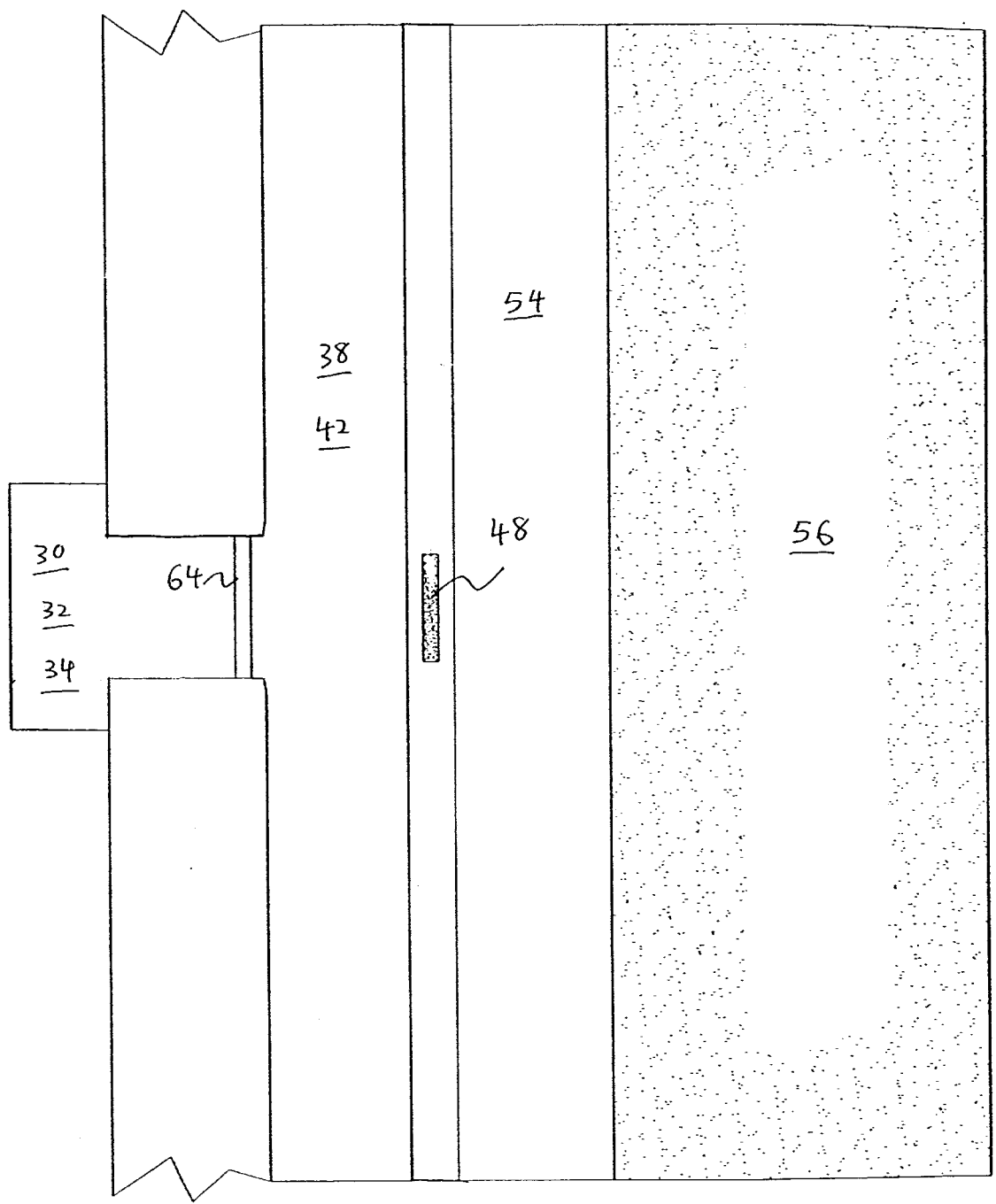
FIG. 5 is a bottom view of a recording head according to the present invention.

Located adjacent to opposing pole 38, opposite main pole 30 and coil 44, is a read element 48. The read element 48 is preferably a GMR read element or spin valve, operating in conjunction with electrical contacts 50 located on opposing sides of the read element 48. If the read element 48 is a GMR read element, a permanent magnet 52 may be located above the read element 48. The read element 48 is also located between a pair of opposing magnetic shields, with one magnetic shield formed by the opposing pole 38, and the other magnetic shield designated by the reference number 54. The entire recording head 22 is built up upon a substrate Referring to FIGS. 3 and 4, the tip 32 of a main pole 30 of the present invention is compared with the tip 58 of a main pole 60 of a prior art longitudinal recording head 62. These figures illustrate a first throatheight B and a second throatheight C. The first throatheight B is the distance from the bottom surface 34 and 42 to the end of the throatheight defining structure 68, wherein the main pole tip 32 and opposing pole 38 are separated only by the write gap 64. The second throatheight C is the distance from the bottom surfaces 34 and 42 to the top of the pole tip 32. Referring to FIG. 3, the first throatheight B and second throatheight C are defined in prior art recording heads by the photoresist throatheight structure 66. Conversely, referring to FIG. 4, the first throatheight B and second throatheight C of the present invention are defined by the precision throatheight defining structure 68, preferably made of NiPd.

Figure 6:
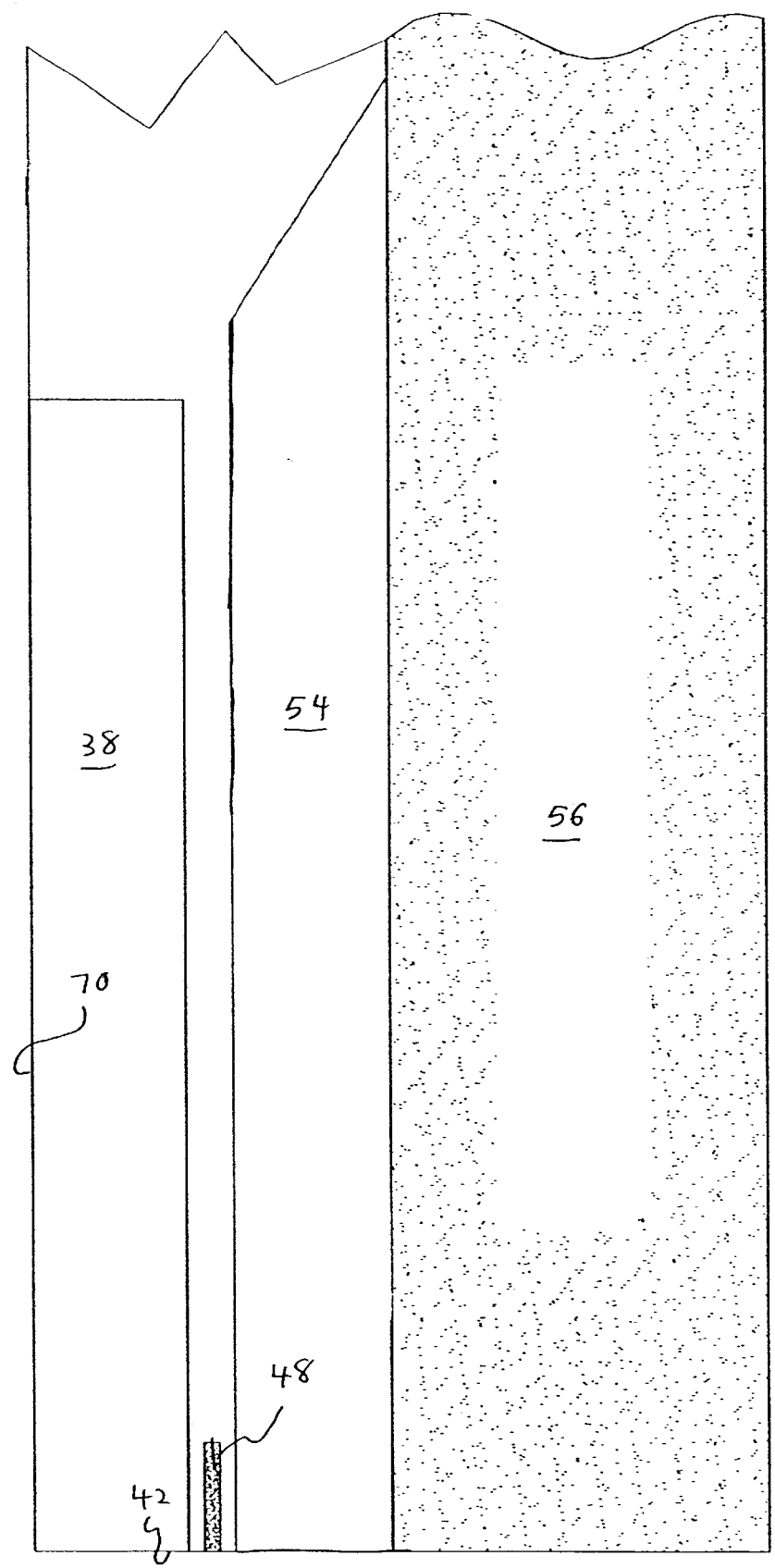
FIG. 6 is a side cross-sectional view of a substrate, read element, and the read element's magnetic shields for use within a recording head of the present invention.
Figure 7:
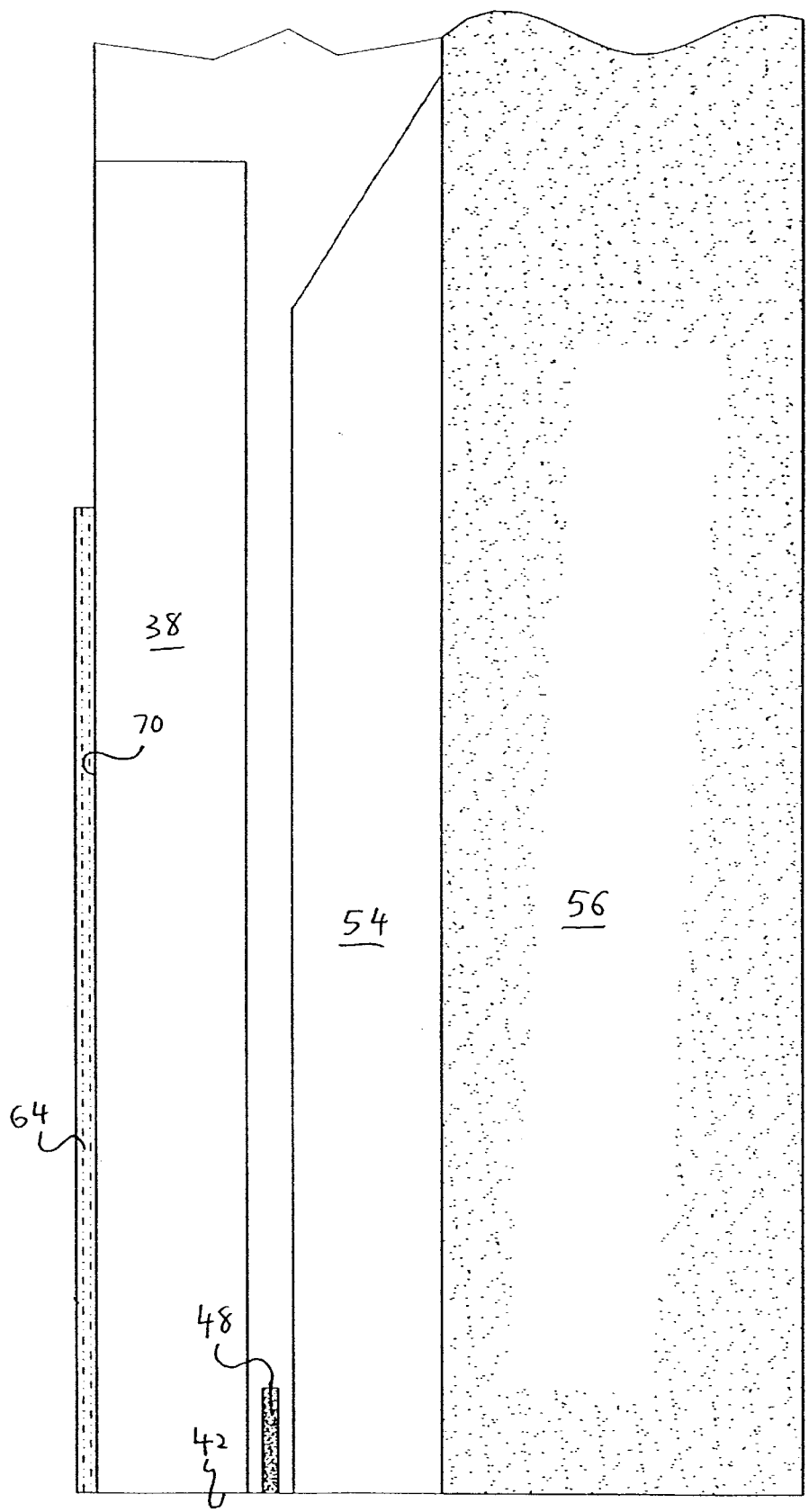
FIG. 7 is a side cross-sectional view of a substrate, read element, shields, and write gap for a recording head of the present invention.
Figure 8:
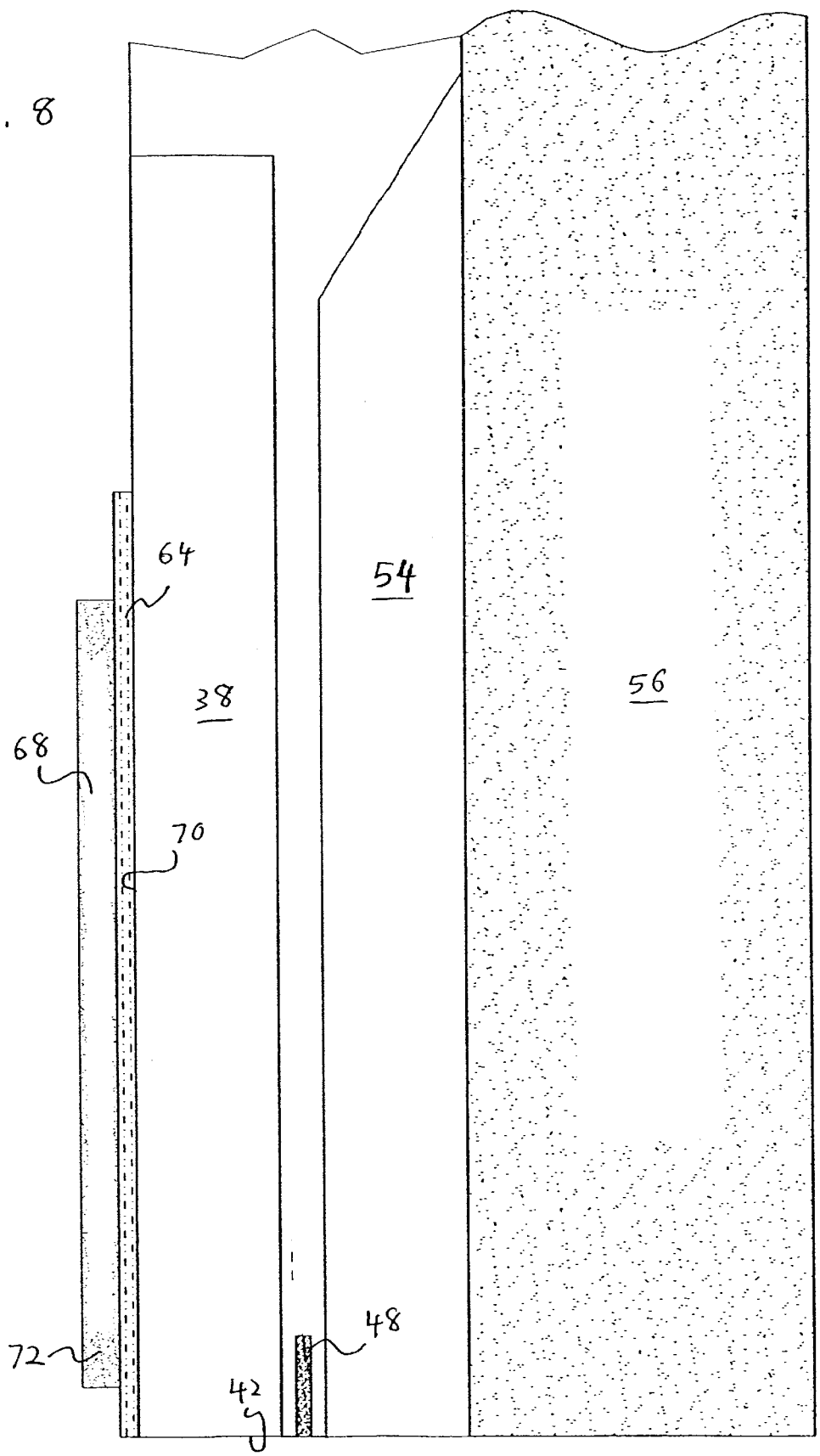
FIG. 8 is a side cross-sectional view of a substrate, read element, shields, write gap, and throat height structure for a recording head of the present invention.
Figure 9:
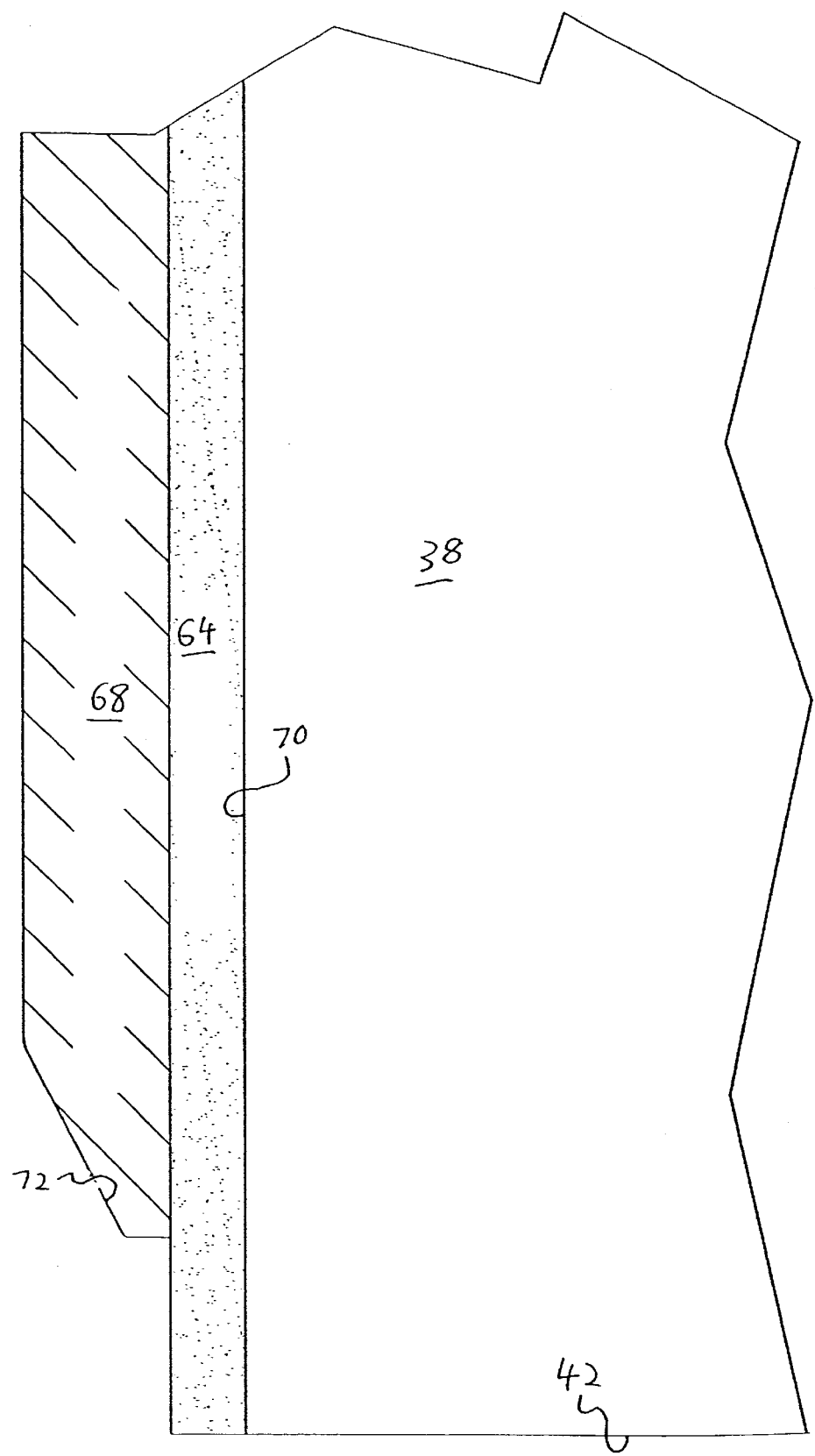
FIG. 9 is a side cross-sectional view of a shield, write gap, and alternative throat height structure for a recording head of the present invention.
Figure 10:
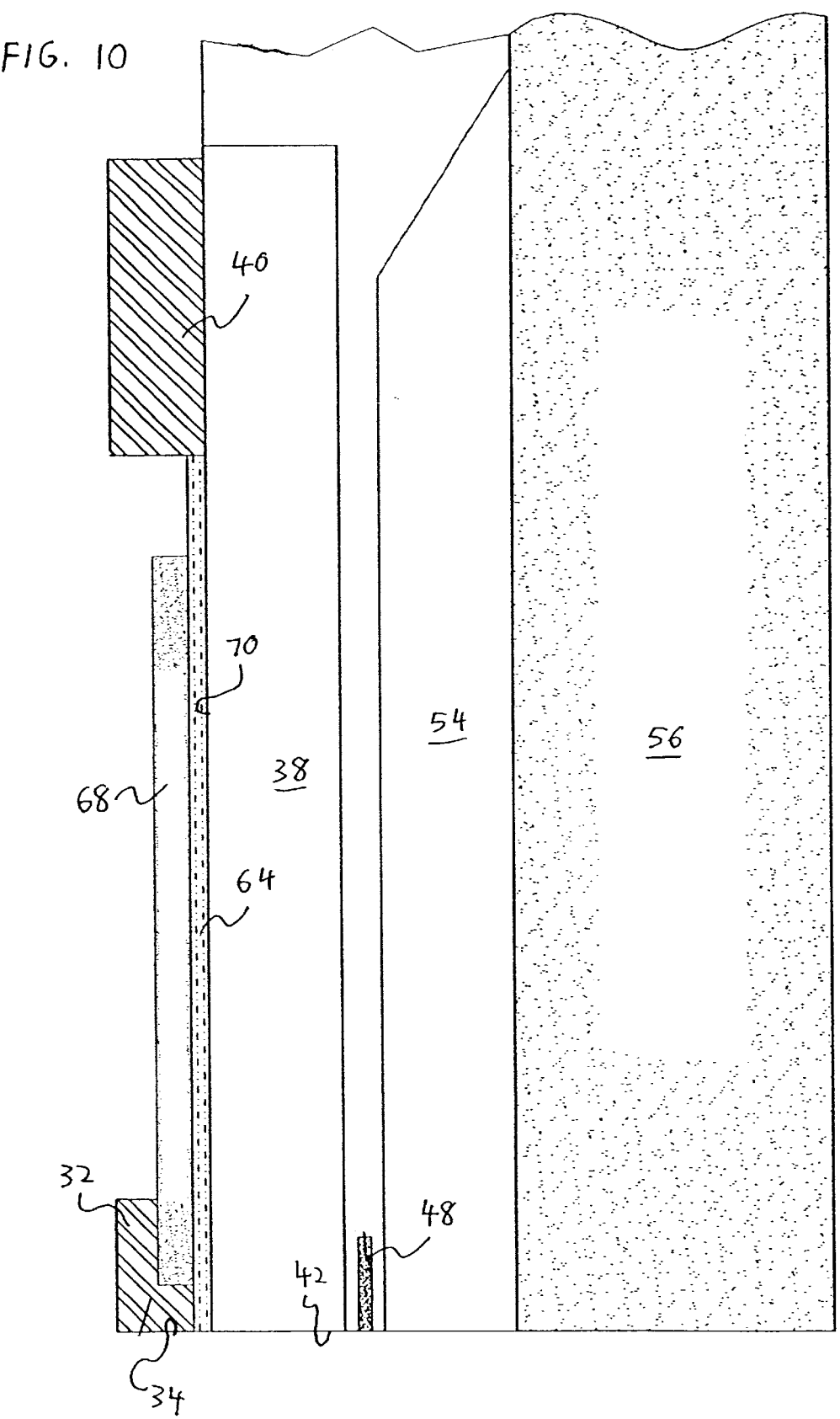
FIG. 10 is a side cross-sectional view of a substrate, read element, shields, write gap, throat height structure, and partially deposited write pole for a recording head of the present invention.
Figure 11:
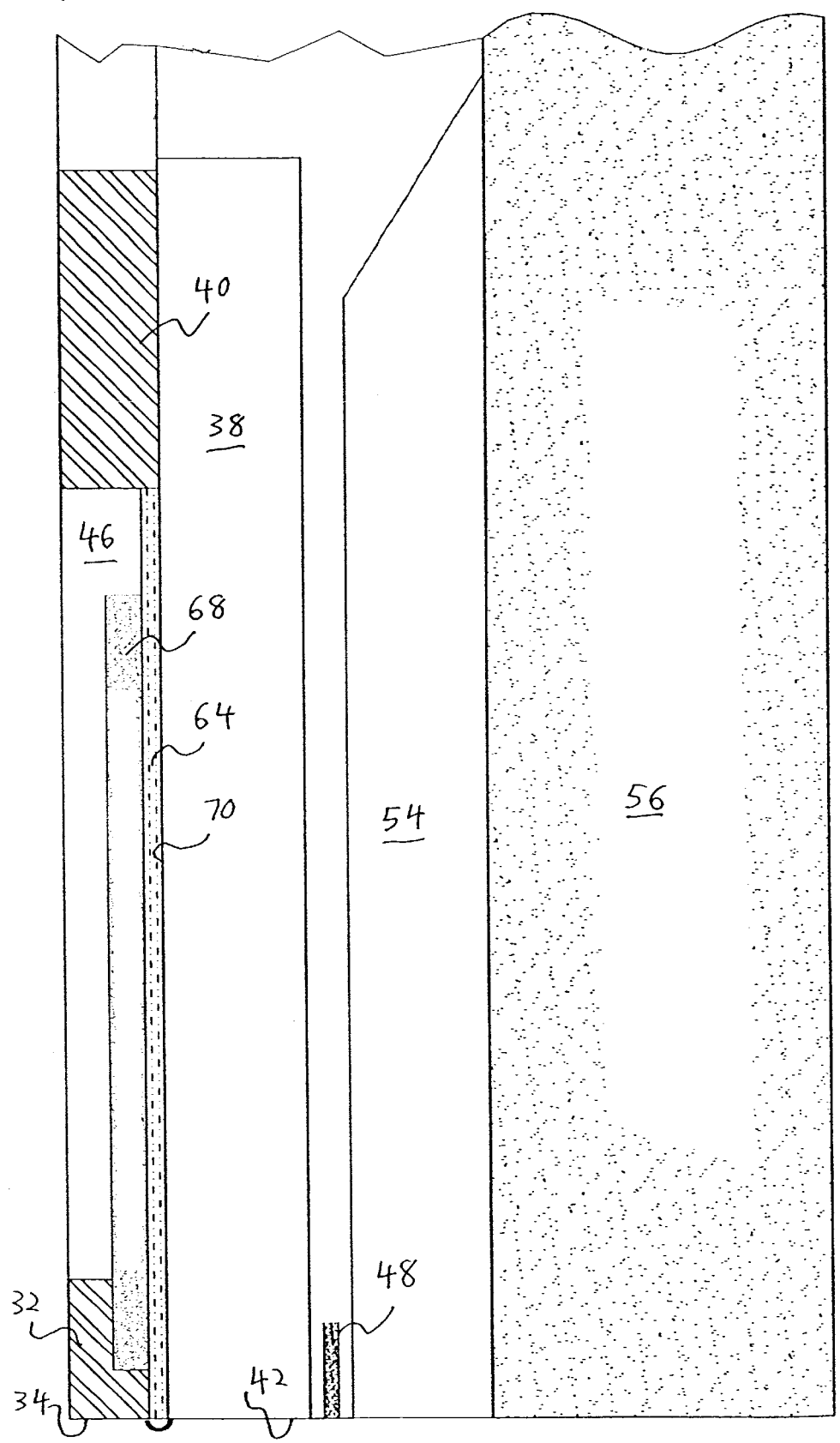
FIG. 11 is a side cross-sectional view of a substrate, read element, shields, write gap, partially deposited main pole, and insulation for a recording head of the present invention.
Figure 1:
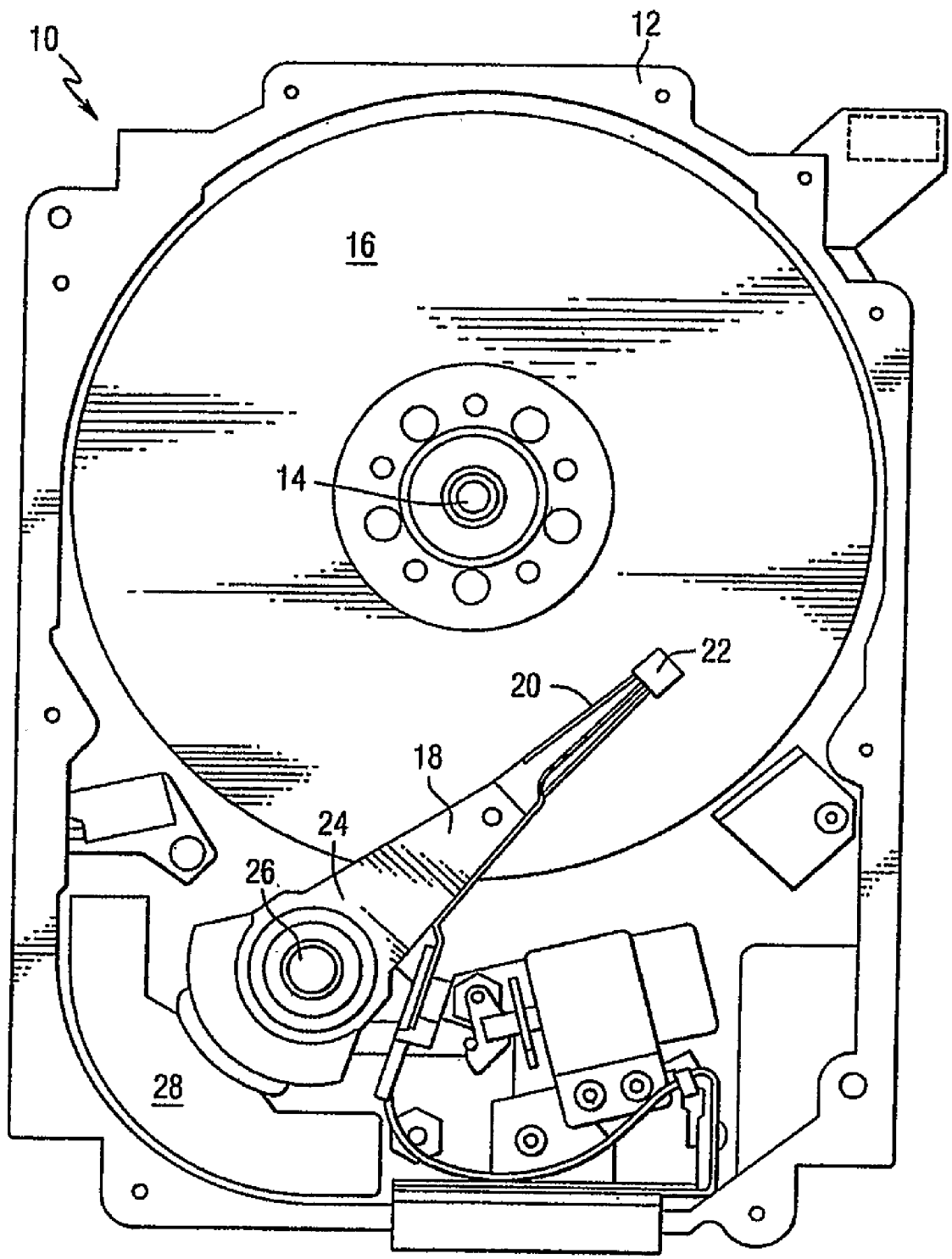
Figure 2:
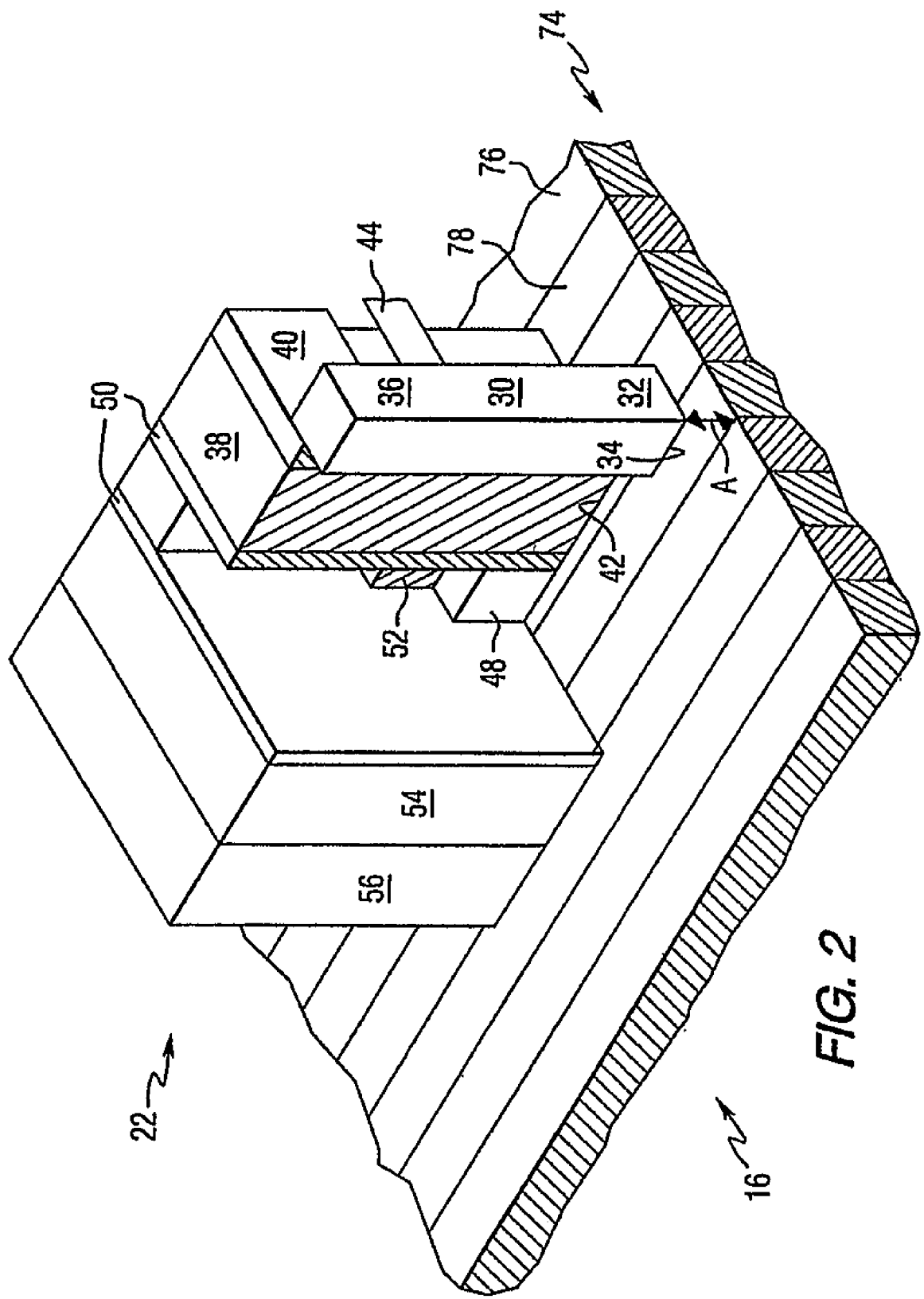
Figure 3:
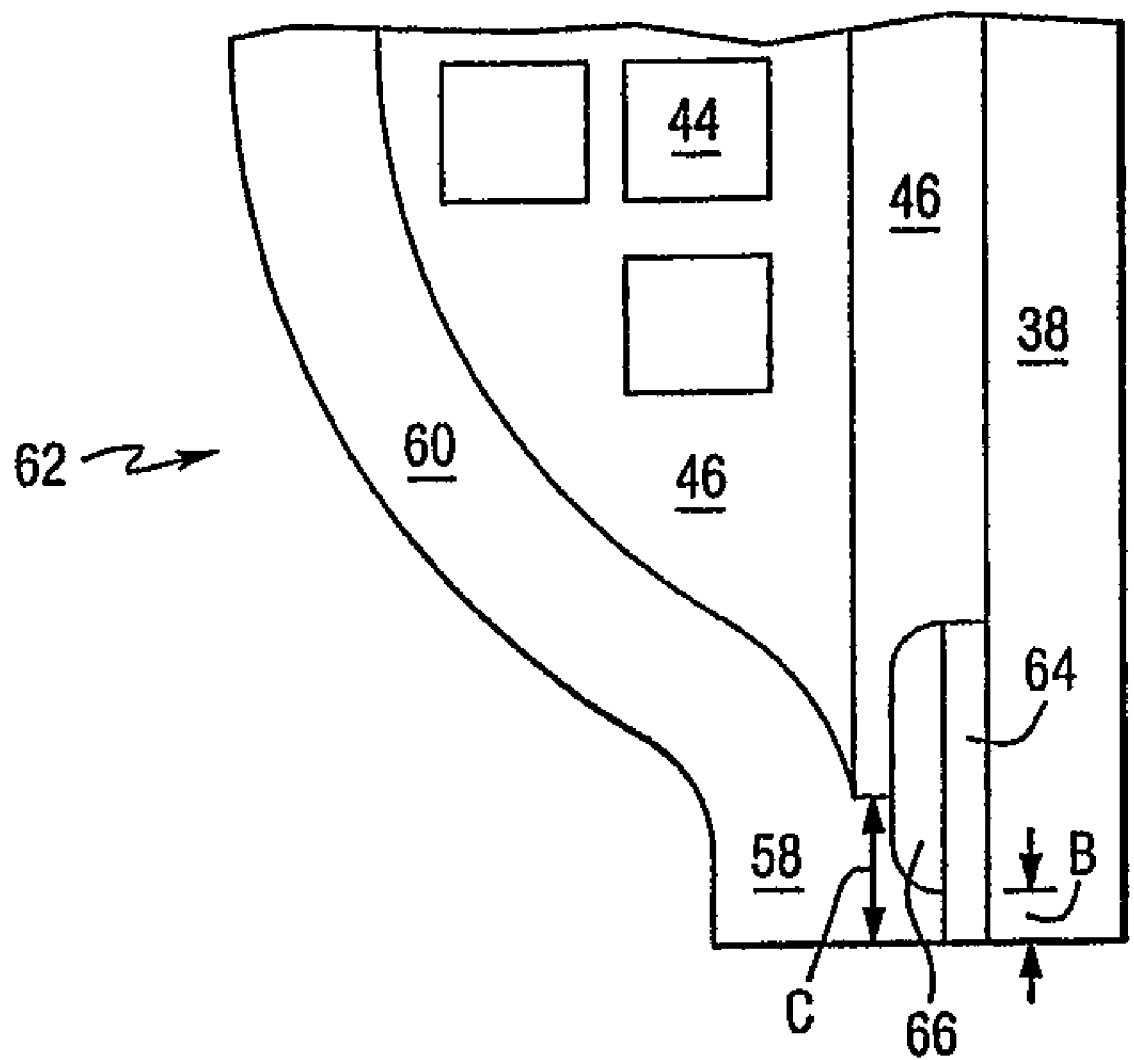

Referring to FIGS. 6–11, a method of manufacturing a longitudinal recording head of the present invention is illustrated. As illustrated in FIG. 6, the method begins by providing a substrate 56 upon which the read element 48 and its associated shields 38 and 54 have already been deposited. The surface 70 of the shield/pole 38 is chemical-mechanical polished to ensure that it is flat. As illustrated in FIG. 7, the write gap 64, which is preferably made from alumina, is deposited on the surface 70. The write gap is preferably 200 to 1000 angstroms thick. Referring to FIG. 8, the NiPd material forming the precision throatheight defining structure 68 is deposited on top of the write gap. The precision throatheight defining structure 68 preferably has a thickness of between 1000 angstroms and 1 micron, and preferably ends a distance of 500 angstroms to 3 microns above the surfaces 34 and 42. At this point, the tip 72 of the precision throatheight defining structure 68 may be angled, preferably by ion milling, to define a desired configuration throatheight. As illustrated in FIG. 10, the joint 40 and main pole's tip 32 are then deposited. Because the tip 32 of the main pole 30 is deposited over the tip 72 of the precision throatheight defining structure 68, the main poles tip 32 will conform to the dimensions and configuration of the precision throatheight defining structure 68. Referring to FIG. 11, insulation 46 is then deposited over the remainder of the precision throatheight defining structure 68 and write gap 64. Referring back to FIG. 4, the coil 44, remaining insulation 46, and remainder of main pole 30 are then deposited.

Referring back to FIG. 2, a magnetic storage medium 16, here a magnetic disc, for use with a longitudinal recording head 22 is illustrated. The disc 16 includes a recording layer 74 having a plurality of magnetically permeable tracks 76, which are divided into sectors. Each sector has several different magnetic fields to within the magnetically permeable material (not shown and well understood). The tracks 76 are separated by nonmagnetized transitions 78. In use, the disc 16 will be separated from the surfaces 34, 42 of the main pole 30 and opposing pole 38, respectively, by a flying height A. The flying height A is sufficiently small so that a high concentration of flux from the main pole 30 will pass through the track 92, but sufficiently large to prevent damage to disc 16 from contact with the recording head 22.

Recording is accomplished by rotating the disc 16 relative to the recording head 22 so that the recording head 22 is located above the appropriate sectors of the tracks 76. As recording progresses, the disc 16 will move past the recording head 22. Current will be supplied to the coil 44, thereby inducing a magnetic field within the main pole 30. This magnetic field will pass through the joint 40 and opposing pole 38, forming a complete loop by jumping across the write gap 64 where the main pole's tip 32 approaches the opposing pole 38 sufficiently close for this to occur. The resulting magnetic field will pass sufficiently far below the bottom surfaces 34 and 42 to affect a sector of the track 76 over which the write gap is located. The magnetic flux at this point will be oriented either parallel or antiparallel to the direction of travel of the magnetic recording medium 16. As a portion of the sector of the track 76 passes under the write gap 64, the orientation of its magnetic field will correspond to the orientation of the magnetic field within the write gap 64. The direction of current passing through the coil 44 will remain constant when a binary "0" is being recorded, thereby creating a consistent orientation of the magnetic fields within the track 76. The current passing through the coil 44 will reverse directions when a binary "1" is being recorded, thereby changing the orientation of a magnetic field within the track 76.

Referring back to FIGS. 3 and 4, a recording head 22 of the present invention has a significantly more precisely defined pole tip 32 configuration, and a more precisely determined first throatheight B and second throatheight C. The dimensions and configuration of the main pole's tip 32 are critical to the magnetic performance of the recording head 22. The precision throatheight defining structure 68 provides a planar surface capable of defining the shape of the main poles tip 32 to a significantly greater degree than the prior art photoresist used to define the throatheight. The use of a stepped structure as illustrated in FIG. 4 permits more precise alignment between the pole tip 32 and throatheight defining structure 68. Furthermore, the precision throatheight defining structure 68 of the present invention ensures that all surfaces of the pole tip 32 are either perpendicular or parallel to the magnetic recording medium 16. This helps to ensure that magnetic flux exiting the bottom surface 34 of the main pole 32 is perpendicular to that surface, thereby resulting in an improved write level.

An important advantage of the use of NiPd to form a precision throatheight defining structure is the elimination of hard bake processes used to cure photoresist. Heating the recording head 22, as occurs during a hard bake process, causes degradation within the layers of the read element 48. The photoresist 66 is difficult to apply precisely using the spinning method currently used to apply liquid photoresist, and also shrinks in an uncontrolled manner during cooling after a hard bake process, thereby reducing the precision with which the throatheight can be defined. Lastly, the hard bake process causes the components of the recording head 22 to expand and contract, resulting in thermal stresses and possibly cracks.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalence thereof.

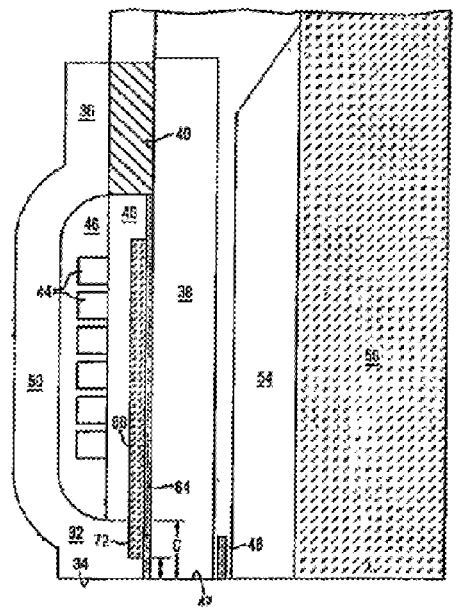

What is claimed is:

1. A longitudinal recording head, comprising:
   a main pole and an opposing pole; and
   a plated NiPd means for precisely defining a throatheight of said main pole.

2. A longitudinal recording head for use with magnetic recording media, said longitudinal recording head comprising:
   a main pole;
   an opposing pole; and
   a plated NiPd precision throatheight defining structure.

3. The longitudinal recording head according to claim 2, wherein said precision throatheight defining structure defines a throatheight between 500 angstroms and 3 microns.

4. The longitudinal recording head according to claim 2, wherein said throatheight is stepped, defining a first throatheight and a second throatheight.

5. The longitudinal recording head according to claim 4, wherein said second throatheight is between 0.5 microns and 4 microns.

6. The longitudinal recording head according to claim 2, wherein said precision throatheight defining structure includes an angled lower surface.

7. The longitudinal recording head according to claim 2, wherein said precision throatheight defining structure has a length, and is substantially perpendicular to a magnetic recording medium.

8. The longitudinal recording head according to claim 2, wherein said precision throatheight defining structure has a thickness between 1000 angstroms and 1 micron.

9. The longitudinal recording head of claim 4, wherein the main pole includes a pole tip having a first surface defining the first throatheight and a second surface defining the second throatheight, said first surface and said second surface each being perpendicular to a surface of a recording medium.

10. The longitudinal recording head of claim 2, wherein the precision throatheight defining structure includes a planar surface defining a portion of a pole tip of the main pole.

11. The longitudinal recording head of claim 2, wherein the main pole includes a pole tip defining a plurality of surfaces, each of the plurality of surfaces lying either perpendicular or parallel to a surface of a recording medium.

12. A longitudinal recording head for use with magnetic recording media, said longitudinal recording head comprising:

a main pole;

an opposing pole;

a gap layer positioned on the opposing pole;

a plated throatheight defining layer positioned on a flat surface of the gap layer and having an end that is substantially parallel to an air bearing surface of the recording head and spaced from the air bearing surface by a first throatheight distance; and a coil embedded in insulation positioned on the plated throatheight defining layer, wherein a pole tip of the main pole is positioned adjacent to the gap layer and adjacent to a portion of the plated throatheight defining layer;

wherein the plated throatheight defining layer comprises a NiPd layer.

13. A longitudinal recording head according to claim 12, wherein the plated throatheight defining layer is tapered adjacent to the end.

* * * * *

UNITED STATES PATENT AND TRADEMARK OFFICE
CERTIFICATE OF CORRECTION

| | |
|---|---|
| PATENT NO. | : 6,594,112 B1 |
| APPLICATION NO. | : 09/755504 |
| DATED | : July 15, 2003 |
| INVENTOR(S) | : Billy Wayne Crue et al. |

It is certified that error appears in the above-identified patent and that said Letters Patent is hereby corrected as shown below:

Delete the title page and substitute therefore the attached title page.

Delete Drawing Sheets 1-11 and substitute therefore the attached Drawing Sheets 1-11.

Signed and Sealed this

Second Day of October, 2007

JON W. DUDAS
*Director of the United States Patent and Trademark Office*

(12) United States Patent
Crue et al.

(10) Patent No.: US 6,594,112 B1
(45) Date of Patent: Jul. 15, 2003

(54) MAGNETIC RECORDING HEAD WITH A PRECISION THROATHEIGHT-DEFINING STRUCTURE

(75) Inventors: Billy Wayne Crue, Pittsburgh, PA (US); Robert Earl Rottmayer, Wexford, PA (US)

(73) Assignee: Seagate Technology LLC, Scotts Valley, CA (US)

(*) Notice: Subject to any disclaimer, the term of this patent is extended or adjusted under 35 U.S.C. 154(b) by 80 days.

(21) Appl. No.: 09/755,504

(22) Filed: Jan. 5, 2001

Related U.S. Application Data
(60) Provisional application No. 60/174,523, filed on Jan. 5, 2000.

(51) Int. Cl.[7] .................. G11B 5/147; G11B 5/23
(52) U.S. Cl. ........................................ 360/126
(58) Field of Search ......................... 360/120, 125, 360/126, 315, 316

(56) References Cited

U.S. PATENT DOCUMENTS

| | | |
|---|---|---|
| 3,940,797 A | 2/1976 | Brock et al. |
| 3,955,213 A | 5/1976 | Brower et al. |
| 4,017,965 A | 4/1977 | Brutsch et al. |
| 4,100,584 A | 7/1978 | Behr et al. |
| 4,110,804 A | 8/1978 | Castrodale et al. |
| 4,219,855 A | 8/1980 | Jones, Jr. |
| 4,490,760 A | 12/1984 | Kaminaka et al. |
| 5,438,747 A * | 8/1995 | Krounbi et al. ........... 360/317 |
| 5,479,310 A * | 12/1995 | Atsushi et al. ........... 360/126 |
| 5,612,843 A | 3/1997 | Packard |
| 5,621,596 A | 4/1997 | Santini |
| 5,652,687 A | 7/1997 | Chen et al. ........... 360/126 |
| 5,978,187 A * | 11/1999 | Shouji et al. ........... 360/126 |
| 6,018,862 A * | 2/2000 | Stageberg et al. ........... 360/126 |
| 6,111,724 A * | 8/2000 | Santini ........... 360/126 |
| 6,134,080 A * | 10/2000 | Chang et al. ........... 360/126 |
| 6,172,848 B1 | 1/2001 | Santini |
| 6,233,813 B1 | 5/2001 | Sasaki et al. |
| 6,369,984 B1 * | 4/2002 | Sato ........... 360/126 |
| 6,490,125 B1 * | 12/2002 | Barr ........... 360/126 |

OTHER PUBLICATIONS

Jeong et al. "Magnetization and Magnetic Anisotropy in NiPd Multilayer Films," Digest of Magnetics Conference, 1999, p. G 09.*

* cited by examiner

*Primary Examiner*—George J. Letscher
*Assistant Examiner*—Christopher R. Beacham
(74) *Attorney, Agent, or Firm*—Robert P. Lenart, Esq.; Pietragallo, Bosick & Gordon

(57) ABSTRACT

A recording head for use with magnetic recording media includes a structure having a precisely defined throat height. The throat height of a typical recording head is defined by a photoresist structure formed through a hard bake process. It is difficult to control the thickness of the photoresist during the spinning and hard bake process, resulting in magnetically inefficient structure at the tip of the recording head's main write pole. The use of an NiPd plating results in a more accurately defined throat height, and resulting magnetically efficient structure. A method of manufacturing the recording head of the present invention is also provided.

13 Claims, 11 Drawing Sheets